(12) United States Patent
Goodier et al.

(10) Patent No.: US 10,533,469 B2
(45) Date of Patent: Jan. 14, 2020

(54) FLUID CONTAINER

(71) Applicant: Castrol Limited, Pangbourne, Reading (GB)

(72) Inventors: Steven Paul Goodier, Berkshire (GB); Peter Stuart Brett, Berkshire (GB); Mark O'Malley, Berkshire (GB); Oliver Paul Taylor, Berkshire (GB)

(73) Assignee: Castrol Limited, Reading (GB)

( * ) Notice: Subject to any disclaimer, the term of this patent is extended or adjusted under 35 U.S.C. 154(b) by 96 days.

(21) Appl. No.: 15/312,613

(22) PCT Filed: May 21, 2015

(86) PCT No.: PCT/EP2015/061338
§ 371 (c)(1),
(2) Date: Nov. 18, 2016

(87) PCT Pub. No.: WO2015/177320
PCT Pub. Date: Nov. 26, 2015

(65) Prior Publication Data
US 2017/0122151 A1  May 4, 2017

(30) Foreign Application Priority Data

May 21, 2014 (GB) .................................. 1409082.3

(51) Int. Cl.
*F01M 11/03* (2006.01)
*F01M 11/00* (2006.01)
(Continued)

(52) U.S. Cl.
CPC ......... *F01M 11/0004* (2013.01); *B65D 25/20* (2013.01); *B65D 25/38* (2013.01); *F01M 11/03* (2013.01); *F01M 11/04* (2013.01); *F01P 11/06* (2013.01); *G05D 7/0617* (2013.01); *F01M 2011/0095* (2013.01); *F01M 2011/0483* (2013.01); *Y10T 137/2506* (2015.04)

(58) Field of Classification Search
CPC .... F01M 9/02; F01M 11/03; F01M 2011/031; F01M 2001/1014; F02M 43/00; Y10T 137/2506
See application file for complete search history.

(56) References Cited

U.S. PATENT DOCUMENTS 3,336,223 A   8/1967 Kneeland
3,399,776 A   9/1968 Knuth
(Continued)

FOREIGN PATENT DOCUMENTS

CN   CA 1091177   8/1994
CN   CA 1160135   8/2004
(Continued)

*Primary Examiner* — Kevin F Murphy
(74) *Attorney, Agent, or Firm* — McDonnell Boehnen Hulbert & Berghoff LLP

(57) ABSTRACT

The present invention relates to a replaceable fluid container for an engine comprising: a first reservoir for holding a fluid; a second reservoir for holding a composition to be added to the fluid; a fluid coupling adapted to provide fluidic communication between the first reservoir and a fluid circulation system of the engine; and a dose controller to provide a dose of the composition into the fluid for circulation in a fluid circulation system of the engine.

28 Claims, 4 Drawing Sheets

(51) Int. Cl.
*F01M 11/04* (2006.01)
*B65D 25/20* (2006.01)
*B65D 25/38* (2006.01)
*F01P 11/06* (2006.01)
*G05D 7/06* (2006.01)

(56) References Cited

U.S. PATENT DOCUMENTS

| | | |
|---|---|---|
| 4,075,097 A | 2/1978 | Paul |
| 4,075,098 A | 2/1978 | Paul et al. |
| 4,144,166 A | 3/1979 | DeJovine |
| 4,151,823 A | 5/1979 | Grosse et al. |
| 4,265,748 A | 5/1981 | Villiani et al. |
| 4,327,262 A | 4/1982 | Kull |
| 4,406,784 A | 9/1983 | Cochran |
| 4,615,305 A | 10/1986 | Matsumoto |
| 4,755,289 A | 7/1988 | Villiani |
| 4,847,768 A | 7/1989 | Schwartz et al. |
| 5,273,085 A | 12/1993 | Edwards et al. |
| 5,327,861 A | 7/1994 | Rogalia et al. |
| 5,454,354 A | 10/1995 | Miller |
| 5,552,040 A | 9/1996 | Baehler et al. |
| 5,567,342 A | 10/1996 | Inoue et al. |
| 5,591,330 A | 1/1997 | Lefebvre |
| 5,640,936 A | 6/1997 | Hudson |
| 5,701,862 A | 12/1997 | Inoue et al. |
| 5,725,031 A | 3/1998 | Bilski et al. |
| 5,871,068 A | 2/1999 | Shelby |
| 6,045,692 A | 4/2000 | Bilski et al. |
| 6,048,454 A | 4/2000 | Jenkins |
| 6,161,510 A | 12/2000 | Ishikawa et al. |
| 6,172,602 B1 | 1/2001 | Hastjord |
| 6,196,057 B1 | 3/2001 | Discenzo |
| 6,348,149 B1 | 2/2002 | Jenkins et al. |
| 6,374,797 B1 | 4/2002 | Fischer |
| 6,793,818 B1 | 9/2004 | Entringer et al. |
| 6,938,585 B2 * | 9/2005 | Schneider ............... F01M 9/02 123/1 A |
| 7,124,729 B2 | 10/2006 | Caracciolo |
| 7,370,514 B2 | 5/2008 | Halalay et al. |
| 7,581,434 B1 | 9/2009 | Discenzo et al. |
| 7,713,425 B2 | 5/2010 | Hanson et al. |
| 8,061,383 B2 * | 11/2011 | Gouzou ............... F02D 19/12 123/1 A |
| 8,165,831 B2 | 4/2012 | Matsunaga et al. |
| 8,327,818 B2 | 12/2012 | Jefferies et al. |
| 8,783,214 B2 | 7/2014 | Sachdev et al. |
| 9,869,219 B2 | 1/2018 | Barnes et al. |
| 9,878,822 B2 | 1/2018 | Barnes et al. |
| 9,890,901 B2 | 2/2018 | Brett et al. |
| 9,938,867 B2 | 4/2018 | Brett et al. |
| 2004/0079589 A1 | 4/2004 | Schneider |
| 2005/0118468 A1 | 6/2005 | Adams et al. |
| 2005/0161628 A1 | 7/2005 | Tiberghien et al. |
| 2006/0254986 A1 | 11/2006 | Hanson et al. |
| 2007/0050095 A1 | 3/2007 | Nelson et al. |
| 2007/0113921 A1 | 5/2007 | Capizzo |
| 2008/0088127 A1 | 4/2008 | Tiberghien |
| 2008/0179139 A1 | 7/2008 | Montgomery |
| 2008/0265574 A1 | 10/2008 | Tiberghien et al. |
| 2008/0302606 A1 | 12/2008 | Alston |
| 2009/0206024 A1 | 8/2009 | Bilski |
| 2009/0211552 A1 | 8/2009 | Prior et al. |
| 2009/0303466 A1 | 12/2009 | Arakawa et al. |
| 2010/0126251 A1 * | 5/2010 | Pileggi ............... F01M 11/10 73/53.07 |
| 2010/0228400 A1 | 9/2010 | Johnson et al. |
| 2011/0041796 A1 * | 2/2011 | Sachdev ............... F01M 9/02 123/196 A |
| 2011/0048857 A1 * | 3/2011 | McGilvray ............... F01M 9/02 184/6.12 |
| 2011/0253092 A1 | 10/2011 | Springer et al. |
| 2012/0265429 A1 | 10/2012 | Perera et al. |
| 2013/0239845 A1 | 9/2013 | Frazier et al. |
| 2014/0159364 A1 | 6/2014 | Harris et al. |
| 2014/0331746 A1 | 11/2014 | Ito |
| 2015/0291133 A1 | 10/2015 | Hidalgo |
| 2015/0291317 A1 | 10/2015 | Brett et al. |
| 2015/0292372 A1 | 10/2015 | Barnes et al. |
| 2017/0089234 A1 | 3/2017 | Dawson et al. |
| 2017/0089235 A1 | 3/2017 | Dawson et al. |
| 2017/0089236 A1 | 3/2017 | Andersen et al. |
| 2017/0101911 A1 | 4/2017 | Barnes et al. |
| 2017/0107873 A1 | 4/2017 | Ali et al. |
| 2017/0183992 A1 | 6/2017 | Barnes et al. |
| 2017/0190466 A1 | 7/2017 | Andersen et al. |
| 2017/0197596 A1 | 7/2017 | Barnes et al. |

FOREIGN PATENT DOCUMENTS

| | | |
|---|---|---|
| CN | CA 1965151 | 5/2007 |
| CN | 101115911 | 1/2008 |
| CN | 101472655 | 7/2009 |
| CN | CA 101256634 | 9/2009 |
| CN | 101994542 | 3/2011 |
| CN | 202991173 | 6/2013 |
| DE | 29513959 | 1/1997 |
| DE | 10136971 | 2/2003 |
| DE | 102011001739 | 10/2012 |
| DE | 102012024365 | 6/2014 |
| EP | 0 661 429 B1 | 10/1996 |
| JP | H06-159031 | 6/1994 |
| JP | H09-329011 | 12/1997 |
| JP | H10-131801 | 5/1998 |
| JP | 2000-130240 | 5/2000 |
| JP | 2001-254893 | 9/2001 |
| JP | 2003 049996 | 2/2003 |
| JP | 2003-312795 | 11/2003 |
| JP | 2004-156455 | 6/2004 |
| JP | 2004-338122 | 12/2004 |
| JP | 2005-091360 | 4/2005 |
| JP | 2005-201219 | 7/2005 |
| JP | 2007 042497 | 2/2007 |
| JP | 2002-212974 | 3/2007 |
| JP | 2008 121468 | 5/2008 |
| JP | 2009-196201 | 9/2009 |
| JP | 2009-214003 | 9/2009 |
| JP | 2009-228636 | 10/2009 |
| JP | 2010-188823 | 9/2010 |
| JP | 2010-244092 | 10/2010 |
| JP | 2011-179339 | 9/2011 |
| JP | 2012-148514 | 8/2012 |
| JP | 2014-084734 | 5/2014 |
| KR | 1020030050005 | 4/2005 |
| WO | WO 01/53663 | 7/2001 |
| WO | 03/072912 | 9/2003 |
| WO | WO 2005/088084 | 9/2005 |
| WO | WO 2007/011882 | 1/2007 |
| WO | WO 2008/001574 | 1/2008 |
| WO | WO 2010/026559 | 3/2010 |
| WO | WO2011/064903 | 4/2013 |
| WO | WO 2031/057768 | 4/2015 |
| WO | WO 2016/158971 | 10/2016 |

* cited by examiner

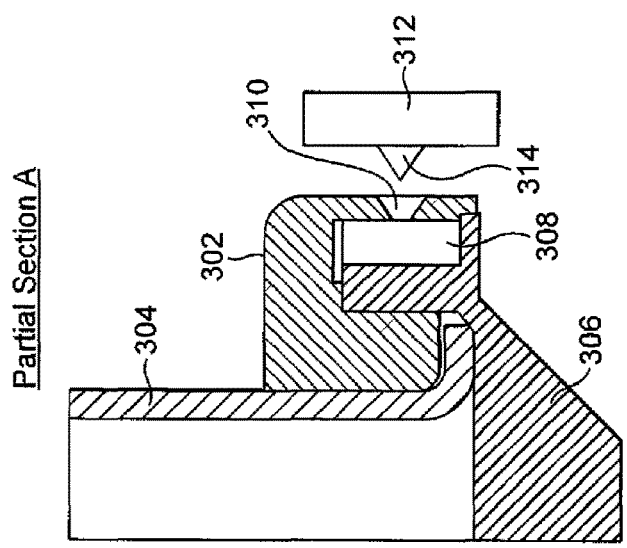
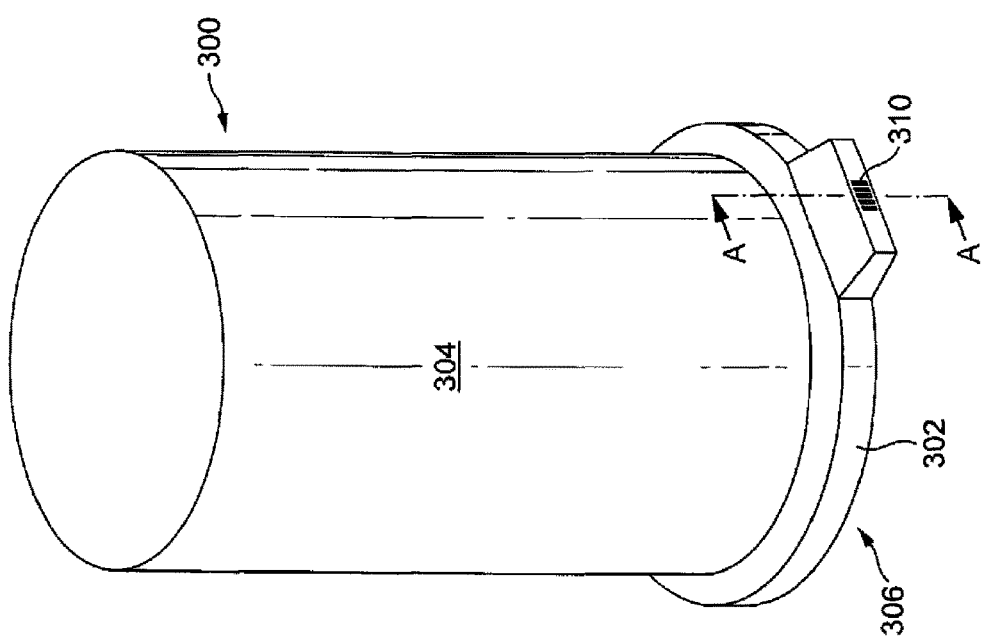

FLUID CONTAINER

CROSS REFERENCE TO RELATED APPLICATIONS

The present application is National Phase application of, and claims the benefit of, International (PCT) Application No. PCT/EP2015/061338, filed on May 21, 2015, which claims priority to GB Application No. 1409082.3, filed on May 21, 2014, the entire contents of both which are incorporated herein by reference.

The invention relates to a replaceable fluid container for an engine.

Engines, such as motor vehicle engines, are provided with fluid circulation systems through which a fluid is circulated to assist engine performance by lubricating or removing heat from moving components of the engine, for example. The fluid may become degraded through use. For example, the fluid may become increasingly viscous or contaminated as it circulates through the fluid circulation system, which may reduce its efficacy.

Embodiments of the invention address at least some of these problems.

The invention is set out in the appended claims.

Embodiments of the invention will now be described, by way of example only, with reference to the accompanying drawings, in which:

FIGS. 4 and 4a show in schematic form an example of a housing of or for a replaceable fluid container for an engine.

Figure 1:
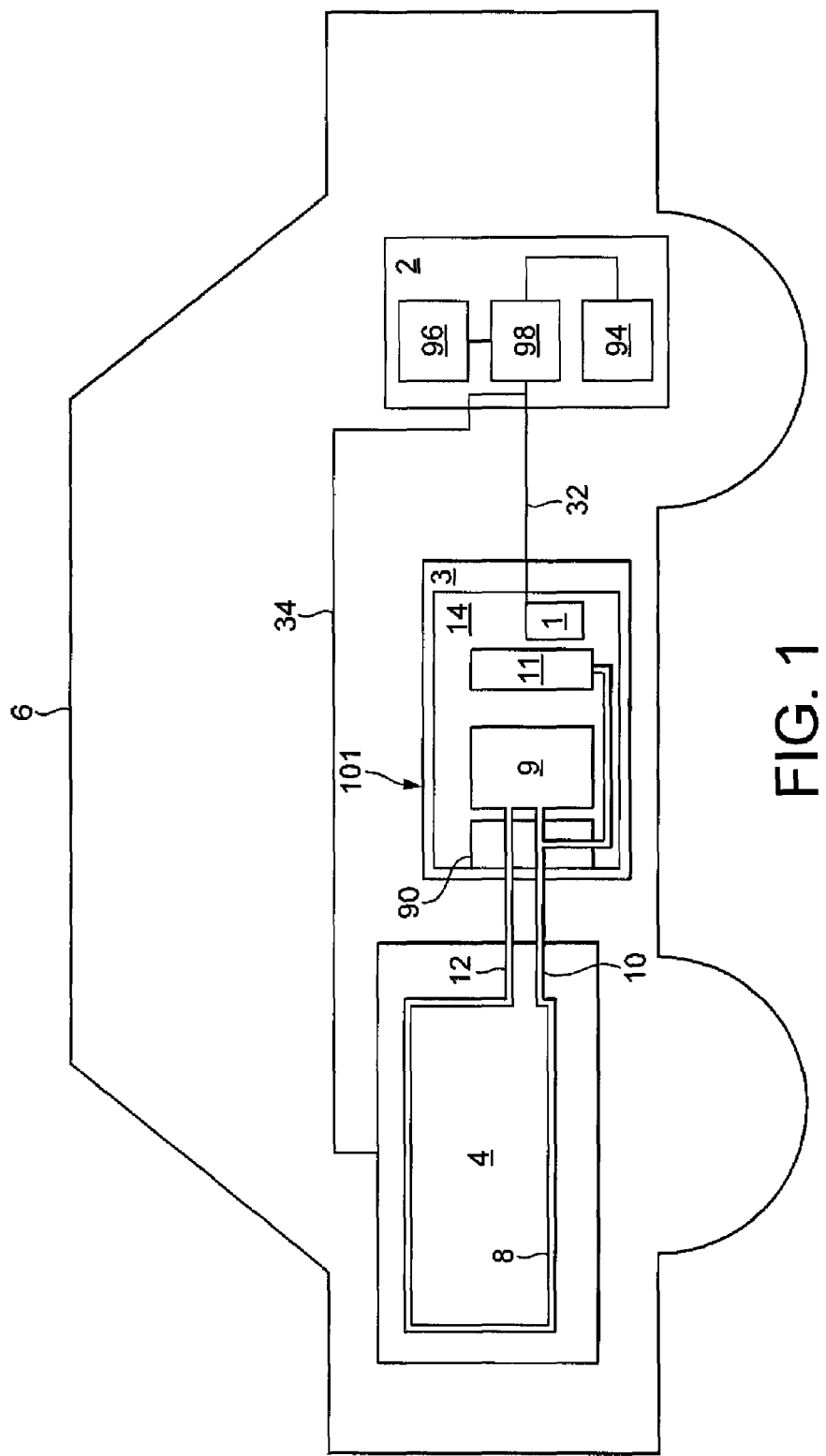
FIG. 1 shows a schematic illustration of a vehicle containing a replaceable fluid container.

Embodiments of the invention may provide a replaceable fluid container for an engine, the replaceable fluid container comprising a first reservoir for holding a fluid, a second reservoir for holding a composition to be added to the fluid, a fluid coupling adapted to provide fluidic communication between the first reservoir and the fluid circulation system of the engine and a dose controller for providing data about the replaceable fluid container to a control system of the engine.

The composition may comprise a viscosity-reducing composition to lower the viscosity of the fluid. The composition may comprise a friction-reducing composition for coating surfaces of the fluid circulation system to reduce the friction between moving parts of the engine. The composition may comprise a fluid-cleaning agent to remove, absorb, convert or reduce contaminants in the fluid. In general, the composition may be an additive for an engine fluid, such as a lubricating or heat-exchange fluid. The composition may, when added to the fluid, change the heat exchange properties of the fluid to assist with a heat exchange function. The composition may, when added to the fluid, make the fluid more lean. The composition may comprise any combination of the foregoing compositions or additives. As used herein, the term composition refers to a substance which may consist of only one constituent or ingredient, or which may comprise one or more constituents or ingredients.

The composition may be a liquid, a suspension, an emulsion, a gas, a vapour or a solid, for example a soluble or insoluble powder or a soluble or dissolvable pellet.

The replaceable fluid container may comprise further reservoirs, wherein each of the further reservoirs provides a different composition. Each reservoir may have a valve for controlling the dosing of its composition into the fluid. The dose controller may be configured to receive a service interval or dosage regime from a controller, such as the control system of the engine, which may be referred to herein as an engine control system or engine control device, to defining time or vehicle mileage intervals at which to dose each of the compositions into the fluid.

The replaceable fluid container may be configured to store identification data indicating, for example, one or more property of the fluid, the composition(s) or the vehicle with which the replaceable fluid container is designed to be used, and may be configured to communicate the identification data to the engine control device. The engine control system may be configured to select a service interval or dosage regime based on identification data received from the dosage controller. The engine control system may be configured to select, or update, a service interval or dosage regime based on fluid-quality data provided by one or more sensors located in the engine or the replaceable fluid container. The dose controller may be configured to receive a selected or updated service interval or dosage regime form the engine control system and to control a valve of the first or a further reservoir to dose the fluid with the composition from that reservoir in accordance with the selected or updated service interval or dosage regime.

As used herein, the term replaceable fluid container means a container for fluid, which container may be inserted into or removed from a cavity, recess or dock in, adjacent to or coupled with an engine, for example a cavity, recess or dock in a vehicle, which cavity, recess or dock is in, adjacent to or coupled with the vehicle engine.

As used herein, the term fluid refers to a fluid which may be used in a fluid system of an engine or a vehicle, for example a lubricating or heat exchange fluid or an ancillary fluid such as a washer fluid.

In the drawings, like reference numerals are used to indicate like elements.

FIG. 1 shows a vehicle 6 comprising an engine 4, a container dock 3 and an engine control system 2. The engine 4 comprises a fluid circulation system 8. The fluid circulation system 8 comprises a fluid supply line 10 and a fluid return line 12. A replaceable fluid container 14 is seated in the container dock 3.

The replaceable fluid container 14 comprises a first reservoir 9 for a fluid, a second reservoir 11 for a composition to be added to the fluid, a fluid coupling 90 adapted to provide fluidic communication between the first reservoir 9 and the fluid circulation system 8 of the engine 4 and a dose controller 1 to dose composition from the second reservoir 11 into the fluid of the first reservoir 9.

The replaceable fluid container 14 is shown positioned in the container dock 3 such that the first reservoir 9 is fluidically coupled to the fluid supply line 10 and the fluid return line 12 of the fluid circulation system 8 via the fluid coupling 90. The fluid circulation system 8 extends between the fluid supply line 10 and the fluid return line 12 such that fluid received into the fluid supply line 10 may circulate around the fluid circulation system 8 and be returned to the first reservoir 9 via the fluid return line 12.

The engine control system 2 is coupled for communication with the dose controller 1 of the replaceable fluid container 14 via the a communication link 32, over which the engine control system 2 may receive data from the replaceable fluid container 14 and send control signals or data relating to a service interval and/or dosage regime. The engine control system 2 is coupled to communicate with, for example to receive operational data from and to send control signals to, the engine 4 via a second communication link 34.

The engine 4 of the present example is an internal combustion engine of a motor vehicle.

The engine control system 2 comprises a communication interface 98, a processor 96 and a data store 94.

The engine control system 2 is arranged to monitor and control at least one parameter of the engine 4 via the second communication link 34. For example, the processor 96 is configured to control at least one operation of the engine 4 based on the monitoring, and based on control data read from data store 94 of the engine control system 2. The data store 94 stores service interval and/or control regime data for dosing of the fluid.

In this example, the communication links are provided by a controller area network (CAN) of the vehicle.

In the illustrated example, the fluid circulation system 8 is a circulation system for circulating a fluid, such as a lubricating and/or a heat exchange fluid, around parts of the engine.

In an example, the container dock 3 comprises a cavity adjacent the engine 4 in which the replaceable fluid container 14 may be seated. The container dock 3 comprises couplings to the fluid supply line 10 and fluid return line 12 of the fluid circulation system 8 to enable fluidic communication between the fluid circulation system 8 and the fluid in the first reservoir 9 when the replaceable fluid container 14 is placed in position. The container dock 3 has a fastening element (not shown) for coupling with a fastening element on the replaceable fluid container 14 to secure the replaceable fluid container 14 in position.

The fastening element may be provided by a locking element, a catch, a latch or a projection or recess configured to engage with a complementary recess or projection on the replaceable fluid container 14. Engagement may comprise forming a frictional or interference fit.

In operation the replaceable fluid container 14 is placed in position in the container dock 3 of the vehicle 6 adjacent the engine 4. When in position, fluidic communication is permitted between the first reservoir 9 and the fluid communication system 8 of the engine 4. When the engine 4 is turned on, fluid is pumped, under the control of the engine control system 2, from the first reservoir 9 of the replaceable fluid container 14, into the fluid supply line 10 and around the fluid circulation system 8. Circulated fluid is returned to the replaceable fluid container 14 via the fluid return line 12.

Placing the replaceable fluid container 14 in position also permits the communication interface of the dose controller 1 to communicate with the engine control system 2. This enables the dose controller 1 to receive service interval data and/or a dosage regime from the engine control system 2 over the first communication link 32. The dose controller 1 controls dosage of the composition into the fluid supplied to the fluid supply line 10 in accordance with the service interval and/or dosage regime.

The engine control system 2 receives operational data from the engine 4 and may update the service interval and/or dosage regime based on the operational data, for example in accordance with rules stored in data store 94 of the engine control system 2.

Figure 2:
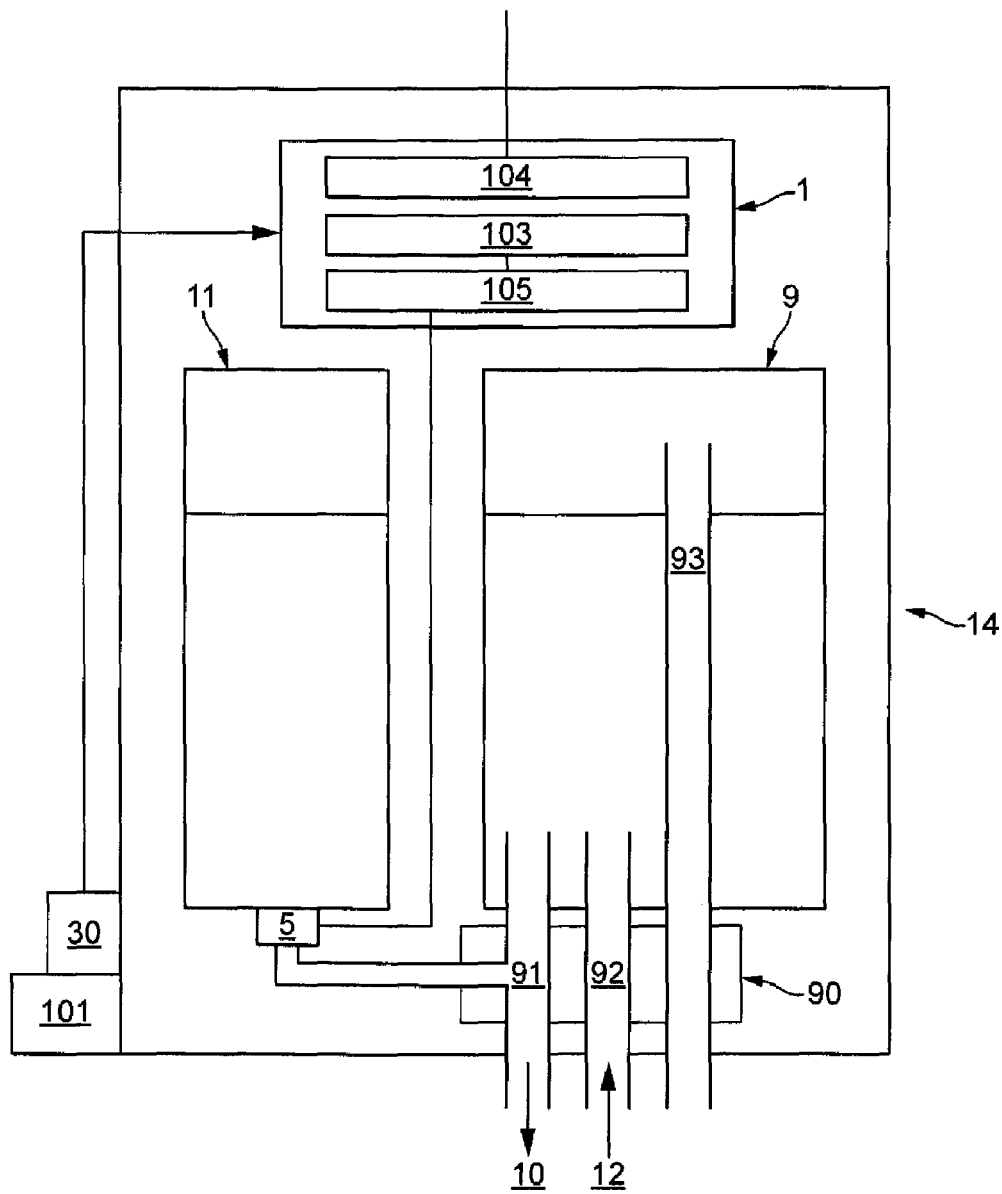
FIG. 2 shows a cross-section through a replaceable fluid container for an engine.

FIG. 2 shows an example of a replaceable fluid container 14 that may be used in the vehicle of FIG. 1.

The replaceable fluid container 14 comprises a first reservoir 9, a second reservoir 11, a fluid coupling 90 and a dose controller 1 as in FIG. 1.

The fluid coupling 90 comprises a fluid outlet port 91, a fluid inlet port 92 and a vent port 93. The fluid outlet port 91, fluid inlet port 92 and vent port 93 are fluidically coupled with the first reservoir 9. The outlet port 91 is adapted to couple with the engine's fluid supply line 10. The fluid inlet port 92 is adapted to couple to the engine's fluid return line 12. The vent port 93 is arranged to facilitate the removal of fluid from the first reservoir 9 without causing an undesirable pressure condition in the first reservoir 9.

The fluid coupling 90 is arranged such that when the replaceable fluid container 14 is placed in position in the container dock 3, the fluid outlet port 91 couples with the fluid supply line 10 of the fluid circulation system 8 and the fluid inlet port 92 couples with the fluid return line 12 of the fluid circulation system 8 such that the fluid outlet port 91 fluidically couples with the fluid supply line 10 and the fluid inlet port 92 fluidically couples to the fluid return line 12.

The replaceable fluid container 14 comprises a fastening element 101 for securing or retaining the replaceable fluid container 14 in position to maintain the fluidic coupling between the first reservoir 9 and the fluid circulation system 8, and a coupling sensor 30 for sensing when the fastening element 101 is engaged to secure the replaceable fluid container 14 in position. The coupling sensor 30 is coupled to provide a signal to the dose controller 1 to indicate that fastening element 101 is engaged.

The dose controller 1 comprises a data store 103, a driver 105 and communication interface 104. The communication interface 104 is coupled for communication of data with the engine control system 2 and for the exchange of data with the data store 103 and the driver 105. The driver is coupled to receive control signals from the communication interface 104 and to read control data from the data store 103.

The second reservoir 11 comprises a valve 5 for controlling dosing of the composition into the fluid provided to the fluid supply line 10. In one example this comprises dosing the composition into the fluid where, or near where, it passes through the fluid outlet port 91. IN another example, the composition is dosed into the fluid supply line 10. In another example, the composition is dosed directly into the first reservoir 9.

The valve 5 is configured such that closing the valve 5 isolates the contents of the second reservoir 11 from the fluid, while opening the valve 5 places the second reservoir 11 in fluidic communication with the fluid provided to the fluid outlet port 91.

The valve 5 is coupled to the driver 105, which is configured to drive opening or closing of the valve in accordance with control signals from the communication interface 104 and/or in accordance with control data read form the data store 103.

The first reservoir 9 is arranged to hold a volume of fluid for circulation through the fluid circulation system 8 of the vehicle 6. In the illustrated example, the fluid is lubricating oil which may also perform a heat exchange function.

The ports 91, 92, 93 of the replaceable fluid container 14 are self-sealing ports which are arranged to form a fluid tight seal with the supply and return lines 10, 12 of the fluid circulation system 8 when the replaceable fluid container 14 is placed in position in the container dock 3.

The second reservoir 11 is arranged to hold a volume of a composition for dosing into the fluid of the first reservoir 9 to alter a property of the fluid. In the illustrated example, the composition is one which reduces the viscosity of the fluid.

The valve 5 of the second reservoir 11 is any suitable electronic valve which may be driven by the driver 105.

The data store 103 of dose controller 1 stores identification data for the fluid and/or the replaceable fluid container 14 and/or the engine with which the replaceable fluid container 14 is intended to be used. The identifier may be a computer readable identifier, an electronic identifier, such as a near field RF communicator, for example a passive or active RFID tag, or an NFC communicator.

The identification data may comprise data relating to the fluid in the first reservoir 9, for example, where the fluid is an oil, the oil grade and/or type, a unique serial number of the replaceable fluid container 14, the length of time (e.g. number of hours) for which the fluid has been in circulation, the number of miles for which the fluid has been in circulation, the vehicle or engine type with which the replaceable fluid container 14 is intended for use, etc. It may additionally or alternatively comprise data related to an engine usage history, comprising for example mileage, velocity data and service data, of an engine with which the replaceable fluid container 14 has been associated.

Figure 3:
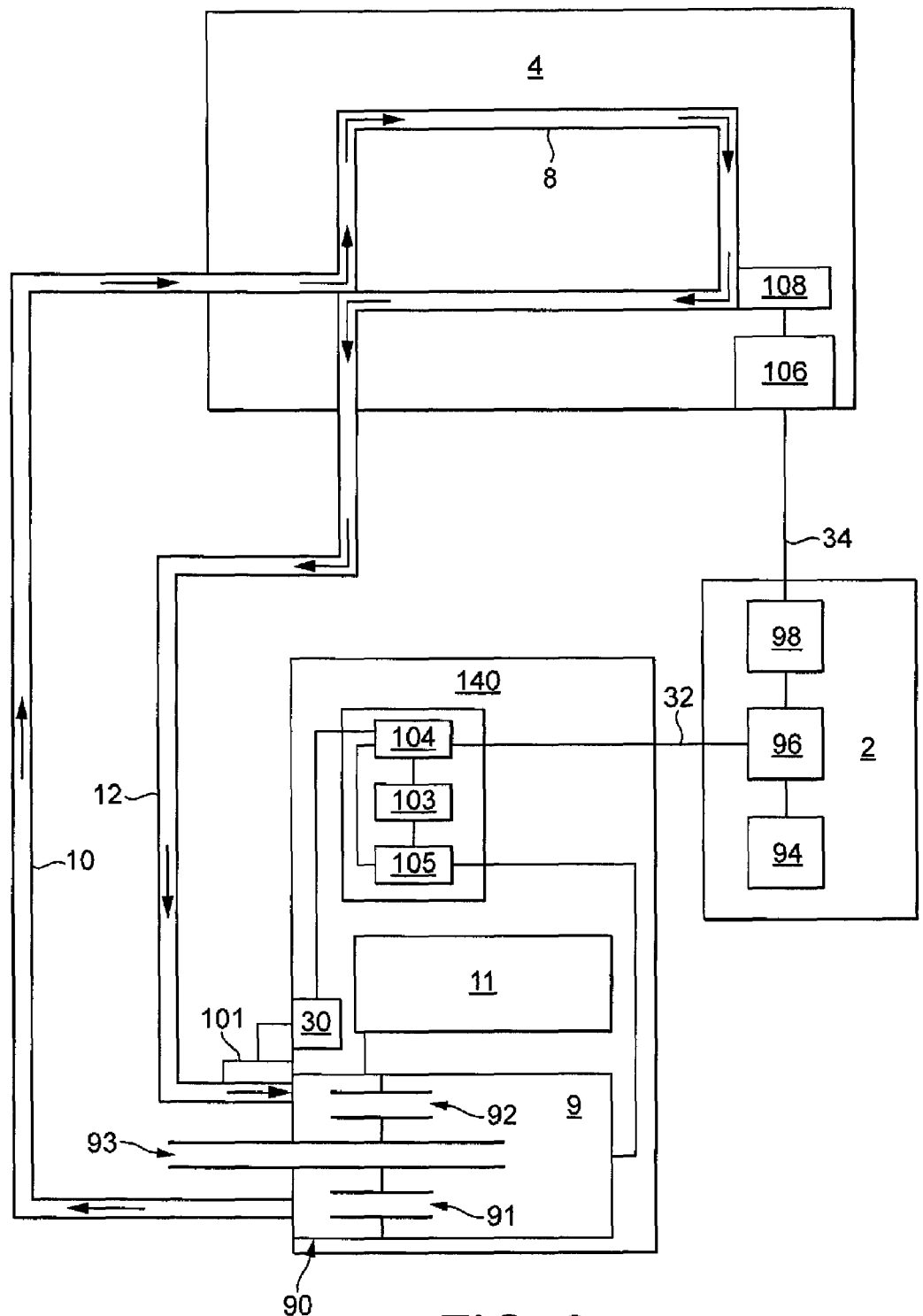
FIG. 3 shows a schematic illustration of components of the vehicle and replaceable fluid container.

FIG. 3 shows in more detail the system shown in FIG. 1.

The engine 4 shown in FIG. 3 comprises an engine communication interface 106 and a sensor 108. The sensor 108 is arranged to sense a quality indicator of the fluid circulating in the fluid circulation system 8. In this example, the sensor 108 is a flow meter configured to sense the viscosity of the fluid. The sensor 108 is coupled to provide a signal representing the sensed viscosity to the engine communication interface 106. The engine communication interface 106 is coupled to provide a signal representing the sensed viscosity to the engine control system 2 over the second communication link 34.

The engine control system 2 comprises a communication interface 98, a processor 96 and a data store 94 a shown in FIG. 1. The data store 94 is arranged for the exchange of data with the processor 96 and the communication interface 98. The processor 96 is arranged for the exchange of data with the data store 94 and the communication interface 98. The communication interface 98 is arranged for communication with the dose controller 1 of the replaceable fluid container 14 and the engine communication interface 106.

The data store 94 of the engine control system 2 is configured to store data comprising any combination of the following:
  identifiers of acceptable fluids for use in the fluid circulation system 8;
  identification data received from the dose controller 1;
  the vehicle mileage;
  data defining a service interval, wherein the service interval is the time period between performing maintenance operations including dosing the fluid with the composition to reduce fluid viscosity;
  data indicating one or more quality indicators of the fluid, such as data indicating transmissibility, opacity, reflectivity, the colour, an electrical resistance, a capacitance, the dielectric constant, the viscosity or the density of the fluid, which quality indicator may have been determined by the sensor or received from another device such as the dose controller or as input by a user;
  data indicative of an expected viscosity or an expected rate of change of viscosity of the fluid based on a timer or on the mileage of the vehicle;
  sets of engine configuration data for configuring the engine to operate in a selected way depending on the engine, vehicle, fuel or fluid type;
  an association table (such as a look-up table) associating fluid identifiers with the sets of engine configuration data. an association table (such as a look-up table) for associating one or more quality indicators of the fluid with a plurality of dose regimes;
  algorithms for determining any of: an expected quality factor of the fluid per unit time or mile, deviation of a sensed quality factor from an expected quality factor, algorithms for selecting a dose regimen based or modifying a dose regimen based on identification data, a sensed quality factor or a deviation of a sensed quality factor from an expected quality factor;
  engine usage history data, comprising for example mileage, velocity data and service data, of an engine with which the replaceable fluid container 14 has been associated.

The processor 96 is configured to compare data stored in the data store 94 with data obtained from the dose controller 1 of the replaceable fluid container 14 and from the communication interface 106 of the engine 4.

The processor 96 is configured to receive data from the sensor 108 and to compare the data with stored data, such as expected values, which may be stored in a look-up table. In the event that this comparison indicates that the viscosity is changing more quickly than expected, or is above outside of a specified tolerance, the processor 96 is configured to update the dosage regime to require the dose controller 1 to dose the composition into the fluid at more regular intervals.

In operation, the coupling sensor 30 senses that the fastening element 101 is an engaged configuration indicating that the first reservoir 9 is in fluidic communication with the fluid circulation system 8 of the engine 4 and communicates the same to the dose controller 1. In response, the dose controller 1 sends its identification data to the engine control device 2. The engine control device 2 compares the identification data with model data stored in a look-up table of its data store 94 and selects a service interval and/or dosage regime matching, for model data that matches, or that most closely matches, the identification data. The engine control device 2 communicates the selected service interval and/or dosage regime data to the dose controller 1. The dose controller 1 saves the data in data store 103 and the driver 105 controls the valve 5 of the second reservoir 11 to dose the composition into the fluid in dose sizes and/or intervals defined by the service interval and/or dosage regime.

At intervals, the engine control device 2 receives data indicating the viscosity of the fluid in the fluid circulation system 8 from the engine communication interface 106. The engine control device 2 compares the viscosity data with model data, which indicates an expected or tolerated viscosity. If the comparison reveals that the measured viscosity exceeds the expected or tolerated viscosity, the engine control device 2 selects from its lookup table a new service interval and/or dosage regime which provides for more frequent dosing, and sends data representing the new service interval and/or dosage regime to the dose controller 1. The dose controller 1 updates its data store 103 with the new service interval and/or dosage regime and accordingly drives the valve 5 of the second reservoir 11 to dose the composition into the fluid more frequently.

In an example, a replaceable fluid container is provided which comprises a first reservoir and a plurality of further reservoirs, each for holding a different fluid composition or additive for modifying a property of the fluid, and each arranged to dose the fluid additive into the fluid to be supplied to a fluid supply line under the control of the dose controller. In an example, the replaceable fluid container comprises a second reservoir holding a viscosity-reducing composition, as in the illustrated example, a third reservoir holding a friction-reducing additive and a fourth reservoir containing a fluid-cleaning agent.

In this example, sensors are provided in the engine for sensing the viscosity of the fluid in the fluid circulation system, the friction between rubbing surfaces in the engine and the cleanliness of the fluid. Viscosity and/or cleanliness sensors, other sensors indicated herein or other appropriate sensors may additionally or alternatively be located on or in the replaceable fluid container or on, in or near the container dock 3 and be configured to send indications of one or more sensed quality indicators, such as viscosity or cleanliness, to the dose controller so that the dose controller may provide corresponding indications to the engine control system, or directly to the engine control system, so that the engine control system may update the service interval and/or dosage regime. In this example, the engine control device has look-up tables comprising data on fluid viscosity, friction and cleanliness and selects an appropriate service interval and/or dosage regime based on matching one or more of the measured fluid properties to data in the look-up table.

In general, one or more sensors may be provided for sensing one or more of: an optical property of the fluid such as its transmissibility, opacity, reflectivity or colour, an electrical property of the fluid such as its electrical resistance, capacitance or dielectric constant, a chemical property of the fluid such as it chemical constitution or a physical property of the fluid, such as its density or viscosity. One or more sensors may additionally or alternatively be provided to sense at least one of a temperature and flow rate or other flow characteristic of the fluid.

FIGS. 4 and 4a show one way in which the components of a replaceable fluid container 14 described herein may be housed. FIG. 4 shows an elevation view of a housing 300 and a partial section through a wall of the housing 300. The housing 300 comprises a body 304, and a base 306. The body 304 is secured to the base by a lip 302. A dose controller 308 is carried in the lip 302.

The lip 302 includes a data coupling 310 to enable the dose controller 308 to be coupled to an interface 312 for communicating data with the engine control system 2 (not shown in FIG. 4). The interface 312 comprises connectors 314 for connecting the interface 312 with the dose controller 308.

The base 306 of the housing 300 comprises the fluid coupling (not shown in FIG. 3) for coupling fluid from the first reservoir of the fluid replaceable fluid container with the fluid circulation system of an engine. The fluid coupling and the data coupling 310 are arranged so that connecting the fluid coupling in fluidic communication with the fluid circulation system of an engine also couples the dose controller 308 for data communication with the engine control system 2 via the interface 312 by seating the connectors 314 of the interface in the data coupling 310 on the housing 300.

In this example, the interface 312 and the connectors 314 provide channels which provide measurements for fluid temperature, fluid pressure, fluid quality, fluid type, and the level (e.g. amount) of fluid in the replaceable fluid container, for example. The connectors 314 may be arranged to provide electrical power to the dose controller 308.

It will be understood that the dose controller 308 as shown in FIG. 4 may be configured as described with reference to the dose controller 1 illustrated in FIGS. 1 to 3.

In other examples the coupling sensor 30 may be provided on, in or near the container dock 3 or on or in the replaceable fluid container 14.

In an example the container dock 3 or a constituent thereof, such as a base or sleeve of the container dock 3, may be removable from the vehicle 6.

Although the illustrated example shows the engine of a motor vehicle, those skilled in the art will appreciate that a replaceable fluid container 14 as described herein may be used with other types of engine or "reverse engine" such as a generator or turbine, for example a wind turbine.

The replaceable fluid replaceable fluid container 14 may comprise a sensor for sensing a quality indicator of the fluid and sending a signal representing the same to the dose controller. The quality indicator may indicate the cleanliness, chemical integrity, chemical composition or viscosity of the fluid. In particular, the quality indicator may indicate at least one property selected from the group consisting of: the viscosity of fluid, the density of fluid, the electrical resistance of fluid, the dielectric constant of fluid, the opacity of fluid, the chemical composition of fluid and combinations of two or more thereof. The quality indicator may be obtained by an optical measurement, for example a transmissibility, opacity, reflectivity or colour measurement, by a measurement of an electrical resistance, capacitance or dielectric constant of the fluid or, particularly when the quality indicator is an indicator of viscosity, by a flow-meter or heat sensor reading.

The replaceable fluid container 14 may be a disposable or recyclable replaceable fluid container 14 which may be replaced by a similar replaceable fluid container 14 after its useful lifetime, for example once its contents has been used or is unusable.

The fluid may be any type of fluid for circulation in an engine 4 to support a function of the engine. For example, the fluid may be lubricant, a coolant, a de-icer, or combination thereof. The dose controller 1 may comprise an identifier of the fluid.

In general, the composition may be a gas, a vapour, a liquid, an emulsion or a solid, such as a powder, dissolved or suspended in a carrier liquid or provided in a form, such as a pellet, in which the solid may become dissolved or suspended in the carrier liquid or in the fluid once added thereto.

In other examples, the dose controller 1 may be configured for one way communication. For example the dose controller 1 may be configured only to receive data from the engine control system, so that the data can be provided to the data store 103 of the replaceable fluid container 14. Alternatively the dose controller 1 may be configured only to provide data to the engine control system. In some possibilities the dose controller 1 may be adapted to provide data to and receive data from the engine control system 2.

The data store 103 of the dose controller 1 may be configured to store data comprising at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof The data store 103 may be configured to receive data from an engine control system to enable the data to be stored at the replaceable fluid container 14, or vice-versa. Such stored data can then be provided to diagnostic devices during servicing and/or during replacement of the replaceable fluid container 14.

In general, the identification data of the replaceable fluid container 14 may comprise an electronic identifier, an optical identifier, such as a barcode, or a colour coded marker, or optical identifier such as a particular colour on the replaceable fluid container 14 or any combination thereof Regardless of how it is provided, the identifier may be encrypted. In some examples one or both of the first and second communications links 32, 34 may be encrypted and data communicated between the dose controller 1 and the engine control system 2 and/or between the engine control system 2 and the engine 4 may be correspondingly encrypted.

In general, the first and second communication links 32, 34 may comprise any wired or wireless communication link, and may comprise an optical link. The communication interfaces 98 and 106 are provided by the vehicle CAN but any suitable interfaces may be provided.

In other example, a fastening element 101 is not provided. The replaceable fluid container 14 may instead be retained in position by gravity or an interference fit, a bayonet coupling or any appropriate fixture, or by the self-sealing ports. In other examples, the ports are not self-sealing but instead self-sealing mechanisms may be provided by the controller dock 3 or controllable seals, such as electrical, electromechanical or mechanical seals may be provided, which may be controllable by the dose controller 1 or the engine control system 2. In other examples, manual seals may be provided.

In general, any sensor described as being provided in the engine may instead be provided in the replaceable fluid container, container dock or fluid circulation system, and vice-versa.

Information about the oil quality may be obtained through capacitance or resistivity measurements. These might, for example, indicate the presence of water in the oil or of metallic or carbonaceous particulates suspended in the oil. A sensor for sensing friction as described herein may comprise a flow-meter or a heat sensor.

In the context of the present disclosure, those skilled in the art will appreciate that the fluid ports 91, 92, 93 of the fluid replaceable fluid container 14 could comprise any suitable coupling for retaining the fluid replaceable fluid container 14 in fluid communication with the fluid circulation system 8. The port couplings could be arranged to be remotely decoupled from the fluid lines 10, 12. It will further be appreciated that the replaceable fluid container 14 could comprise an actuator to decouple the replaceable fluid container 14 from the circulation system 8.

Although the example shown in FIGS. 4 and 4a comprises conductive electrical connections 314 for communicating with the dose controller a contactless connection may also be used. For example, inductive or capacitive coupling can be used to provide contactless communication. One example of inductive coupling is provided by RFID, however other near field communications technology may also be used. Such couplings may enable electrical power to be transferred to the dose controller 308, and also have the advantage that the data connection does not require any complex mechanical arrangement and the presence of dirt or grease on the couplings 310, 314 is less likely to inhibit communication with the dose controller 308.

The housing 300 may comprise a power provider such as a battery for providing electrical power to the dose controller. This may enable the housing 300 to be provided with a range of sensors, including sensors for fluid temperature, pressure and electrical conductivity and may allow different or more types of sensor to be provided than in the absence of a power supply Where the housing 300 comprises a filter, sensors may be arranged to sense these parameters of the fluid as the fluid flows into the filter, and after the fluid has flowed through the filter.

In general one or more functions of any processors described herein, including the described functionality of the dose controller 1 and the processor 96 of the engine control system 2 may be provided by any appropriate controller, for example by analogue and/or digital logic, field programmable gate arrays, FPGA, application specific integrated circuits, ASIC, a digital signal processor, DSP, or by software loaded into a programmable general purpose processor. Aspects of the disclosure provide computer program products, and tangible non-transitory media storing instructions to program a processor to perform any one or more of the methods described herein.

In other examples, the data store of the engine control system may additionally or alternatively be provided by a remote or off-vehicle data-store such as a cloud data store.

While the communication links shown in the illustrated examples are described as being provided by a CAN of the vehicle, in other the data links are provided by an off-vehicle control network or any appropriate wireless of wired communication link, or any combination thereof.

While in the illustrated example, the fluid circulation system 8 is circulation system for circulating a fluid, such as a lubricating and/or a heat exchange fluid, around parts of the engine, the replaceable fluid containers described herein may be used with other fluid systems or fluid circulation systems associated with an engine or a vehicle.

In an example not illustrated, the replaceable fluid container 14 comprises a chamber for receiving fluid to be supplied to the fluid circulation system and for receiving composition so that the composition may be dosed into the fluid before it is supplied to the fluid circulation system. This may allow the composition to be mixed with the fluid before being supplied. It may allow a known quantity of fluid to be dosed and may assist help to control the strength of the dose. It may help to keep the composition separate from the fluid in the first reservoir 9 until the dosed portion of fluid from the chamber has circulated.

It will be understood that while the fluid circulation system described herein is illustrated as a closed loop system, that is a system in which fluid which has circulated is returned to the replaceable fluid container 14, the fluid circulation system could instead be an open loop system in which used or circulated fluid is temporarily or permanently directed elsewhere, for example to a used-fluid collection chamber or reservoir where it may be cooled or cleaned before being reused or, in some examples, removed from the engine. In particular when the fluid is an engine oil, circulated fluid may be collected in a sump before being drained, returned to the replaceable fluid container 14 or scavenged for use elsewhere.

While in the illustrated examples, the valve 5 is described as an electronic valve, in other examples the valve is a mechanical valve or an electromechanical valve and an appropriate driver is provided. More than one valve may be provided.

In some examples, replaceable fluid containers described herein may have first and/or second reservoirs 9, 11 that may be accessed by a user so that their contents may be replenished or replaced while the replaceable fluid container 14 is in situ or once it has been removed from the vehicle.

It will be understood that the engine control system described herein may be considered an operational controller of the engine.

Further details of examples of data providers and examples of fluid containers may be found in International Application No. PCT/EP2013/074209, the whole contents of which are hereby incorporated by reference.

Other variations and modifications of the apparatus will be apparent to persons of skill in the art in the context of the present disclosure.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein The activities and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

In other examples, the data store of the engine control system may additionally or alternatively be provided by a remote or off-vehicle data-store such as a cloud data store.

While the communication links shown in the illustrated examples are described as being provided by a CAN of the vehicle, in other the data links are provided by an off-vehicle control network or any appropriate wireless of wired communication link, or any combination thereof.

While in the illustrated example, the fluid circulation system 8 is circulation system for circulating a fluid, such as a lubricating and/or a heat exchange fluid, around parts of the engine, the replaceable fluid containers described herein may be used with other fluid systems or fluid circulation systems associated with an engine or a vehicle.

In an example not illustrated, the replaceable fluid container 14 comprises a chamber for receiving fluid to be supplied to the fluid circulation system and for receiving composition so that the composition may be dosed into the fluid before it is supplied to the fluid circulation system. This may allow the composition to be mixed with the fluid before being supplied. It may allow a known quantity of fluid to be dosed and may assist help to control the strength of the dose.

It may help to keep the composition separate from the fluid in the first reservoir 9 until the dosed portion of fluid from the chamber has circulated.

It will be understood that while the fluid circulation system described herein is illustrated as a closed loop system, that is a system in which fluid which has circulated is returned to the replaceable fluid container 14, the fluid circulation system could instead be an open loop system in which used or circulated fluid is temporarily or permanently directed elsewhere, for example to a used-fluid collection chamber or reservoir where it may be cooled or cleaned before being reused or, in some examples, removed from the engine. In particular when the fluid is an engine oil, circulated fluid may be collected in a sump before being drained, returned to the replaceable fluid container 14 or scavenged for use elsewhere.

While in the illustrated examples, the valve 5 is described as an electronic valve, in other examples the valve is a mechanical valve or an electromechanical valve and an appropriate driver is provided. More than one valve may be provided.

In some examples, replaceable fluid containers described herein may have first and/or second reservoirs 9, 11 that may be accessed by a user so that their contents may be replenished or replaced while the replaceable fluid container 14 is in situ or once it has been removed from the vehicle.

It will be understood that the engine control system described herein may be considered an operational controller of the engine.

The invention claimed is:

1. A replaceable fluid container comprising:
   a first reservoir for holding a fluid, wherein the first reservoir is in a housing of the replaceable fluid container;
   a second reservoir for holding a composition to be added to the fluid, wherein the second reservoir is in the housing;
   a fluid coupling adapted to provide fluidic communication between the first reservoir and a fluid circulation system of an engine, wherein the engine is disposed outside of the housing, wherein the fluid coupling comprises a fluid inlet port and a fluid outlet port, wherein the fluid outlet port is adapted to be coupled with a fluid supply line, wherein the second reservoir comprises a valve for controlling the dosing of the composition into the fluid in the fluid supply line, wherein the valve is configured such that (i) closing the valve isolates the contents of the second reservoir from the fluid and (ii) opening the valve places the second reservoir in fluidic communication with the fluid provided to the fluid supply line; and
   a dose controller to provide a dose of the composition into the fluid for circulation in the fluid circulation system of the engine, wherein the dose controller comprises a processor and a driver, wherein the driver is configured to drive opening or closing the valve based on a control signal, and wherein the dose controller is in the housing.

2. The replaceable fluid container of claim 1 wherein the dose controller comprises a communication interface for obtaining data from an operational controller associated with the engine, wherein the dose controller is configured to select at least one of a timing, dose quantity and number of doses based on the data obtained from the operational controller.

3. The replaceable fluid container of claim 2 wherein the dose controller is configured to select the at least one of the timing, dose quantity and number of doses based on a control signal received from the operational controller.

4. The replaceable fluid container of claim 2 wherein the dose controller is configured to select the at least one of the timing, dose quantity and number of doses based on at least one of the timing, dose quantity and number of doses of a previous dose.

5. The replaceable fluid container of claim 2 wherein the communication interface is arranged such that positioning the replaceable fluid container to permit fluidic communication between the first reservoir and the fluid circulation system of the engine arranges the communication interface for obtaining the data.

6. The replaceable fluid container of claim 2 wherein the dose controller is configured to inhibit the dosing of the composition into the fluid for circulation unless the communication interface is able to obtain data from the operational controller.

7. The replaceable fluid container of claim 6 wherein the dose controller is configured to select at least one property of a dose of the composition to be added into the fluid for circulation based on data obtained from the engine.

8. The replaceable fluid container claim 2 further comprising a sensor adapted to sense at least one property of a fluid of the first reservoir of the container, wherein the data obtained from the operational controller comprises data based on the sensed property of the fluid.

9. The replaceable fluid container of claim 8 in which the property of the fluid is at least one property selected from the group consisting of: the amount of fluid, the temperature of fluid, the pressure of fluid, the viscosity of fluid, the density of fluid, the electrical resistance of fluid, the dielectric constant of fluid, the opacity of fluid, and the chemical composition of fluid.

10. The replaceable fluid container of claim 9 in which the property of the fluid is at least one property selected from the group consisting of: the viscosity of fluid, the density of fluid, the opacity of fluid, and the chemical composition of fluid.

11. The replaceable fluid container of claim 1 comprising at least one further reservoir for holding a second composition to be added to the fluid, wherein the at least one further reservoir is in the housing, and wherein the dose controller is configured to provide a dose of the second composition from the at least one further reservoir into the fluid.

12. The replaceable fluid container of claim 11 wherein the dose controller is configured to select at least one of the timing, dose quantity and number of doses of the second composition of the at least one further reservoir based on at least one of the timing, dose quantity and number of doses of the composition of the second reservoir.

13. The replaceable fluid container of claim 11 wherein the second composition of the at least one further reservoir is different from the composition of the second reservoir.

14. The replaceable fluid container of claim 11 wherein the second composition of the at least one further reservoir is the same as the composition of the second reservoir.

15. The replaceable fluid container of claim 1 wherein the dose controller comprises a communication interface for obtaining a signal from a controller area network of the engine, and wherein the dose controller is configured to select at least one of the timing, dose quantity and number of doses based on the signal obtained from the controller area network of the engine.

16. The replaceable fluid container of claim 1 wherein the dose controller comprises a data store configured to store data describing the composition of a dose to be provided for circulation in the fluid system of the engine.

17. The replaceable fluid container of claim 16 wherein the data store is further configured to store an association between the data describing a dose and data obtained from the operational controller.

18. The replaceable fluid container of claim 17 wherein the data comprises data obtained from a controller area network of the engine.

19. The replaceable fluid container of claim 16 wherein the data store is removable with the replaceable fluid container.

20. The replaceable fluid container of claim 1 wherein the dose controller is configured to provide the dose of the composition into the fluid in the housing.

21. The replaceable fluid container of claim 1 wherein the dose controller further comprises a communication interface and a data store, wherein the data store comprises identification data relating to the fluid and the composition, wherein the communication interface is configured to send the identification data to an operational controller of the engine, wherein the communication interface is configured to receive data from the operational controller based on the sent identification data, and wherein the control signal is based on the received data from the operational controller.

22. The replaceable fluid container of claim 1 wherein in response to the first reservoir being in fluidic communication with the fluid circulation system of the engine, the communication interface sends the identification data to the operational controller.

23. A dosing system for a fluid circulation system of an engine adapted for use with a replaceable fluid container, wherein the replaceable fluid container comprises a first reservoir for holding a fluid, wherein the first reservoir is in a housing of the replaceable fluid container, a second reservoir for holding a composition to be added to the fluid, wherein the second reservoir is in the housing, a fluid coupling adapted to provide fluidic communication between the first reservoir and the fluid circulation system of the engine, wherein the engine is disposed outside of the housing, wherein the fluid coupling comprises a fluid inlet port and a fluid outlet port, wherein the fluid outlet port is adapted to be coupled with a fluid supply line, wherein the second reservoir comprises a valve for controlling the dosing of the composition into the fluid in the fluid supply line, wherein the valve is configured such that (i) closing the valve isolates the contents of the second reservoir from the fluid and (ii) opening the valve places the second reservoir in fluidic communication with the fluid provided to the fluid supply line, and a dose controller to provide a dose of the composition into the fluid for circulation in the fluid circulation system of the engine, wherein the dose controller comprises a processor and a driver, wherein the driver is configured to drive opening or closing the valve based on a control signal, wherein the dose controller is in the housing, and wherein the dosing system is configured to perform an action selected from the list consisting of: controlling operation of the dose controller; and obtaining operational data for the engine.

24. An apparatus comprising a dosing system according to claim 23 and an engine comprising a fluid circulation system adapted for fluidic communication with the first reservoir of the replaceable fluid container.

25. An apparatus comprising the apparatus of claim 24 and further comprising the replaceable fluid container.

26. A vehicle comprising the apparatus of claim 24.

27. An apparatus comprising the dosing system of claim 23 and further comprising the replaceable fluid container.

28. A vehicle comprising a dosing system for a fluid circulation system of an engine adapted for use with a replaceable fluid container, wherein the replaceable fluid container comprises a first reservoir for holding a fluid, wherein the first reservoir is in a housing of the replaceable fluid container, a second reservoir for holding a composition to be added to the fluid, wherein the second reservoir is in the housing, a fluid coupling adapted to provide fluidic communication between the first reservoir and the fluid circulation system of the engine, wherein the engine is disposed outside of the housing, wherein the fluid coupling comprises a fluid inlet port and a fluid outlet port, wherein the fluid outlet port is adapted to be coupled with a fluid supply line, wherein the second reservoir comprises a valve for controlling the dosing of the composition into the fluid in the fluid supply line, wherein the valve is configured such that (i) closing the valve isolates the contents of the second reservoir from the fluid and (ii) opening the valve places the second reservoir in fluidic communication with the fluid provided to the fluid supply line, and a dose controller to provide a dose of the composition into the fluid for circulation in the fluid circulation system of the engine, wherein the dose controller comprises a processor and a driver, wherein the driver is configured to drive opening or closing the valve based on a control signal, wherein the dose controller is in the housing, and wherein the dosing system is configured to perform an action selected from the list consisting of: controlling operation of the dose controller; and obtaining operational data for the engine.

* * * * *